H. W. ROTTEL.
CRANK MOUNTING FOR ICE MACHINES OF THE COMPRESSION TYPE.
APPLICATION FILED DEC. 29, 1919.
1,343,407.
Patented June 15, 1920.
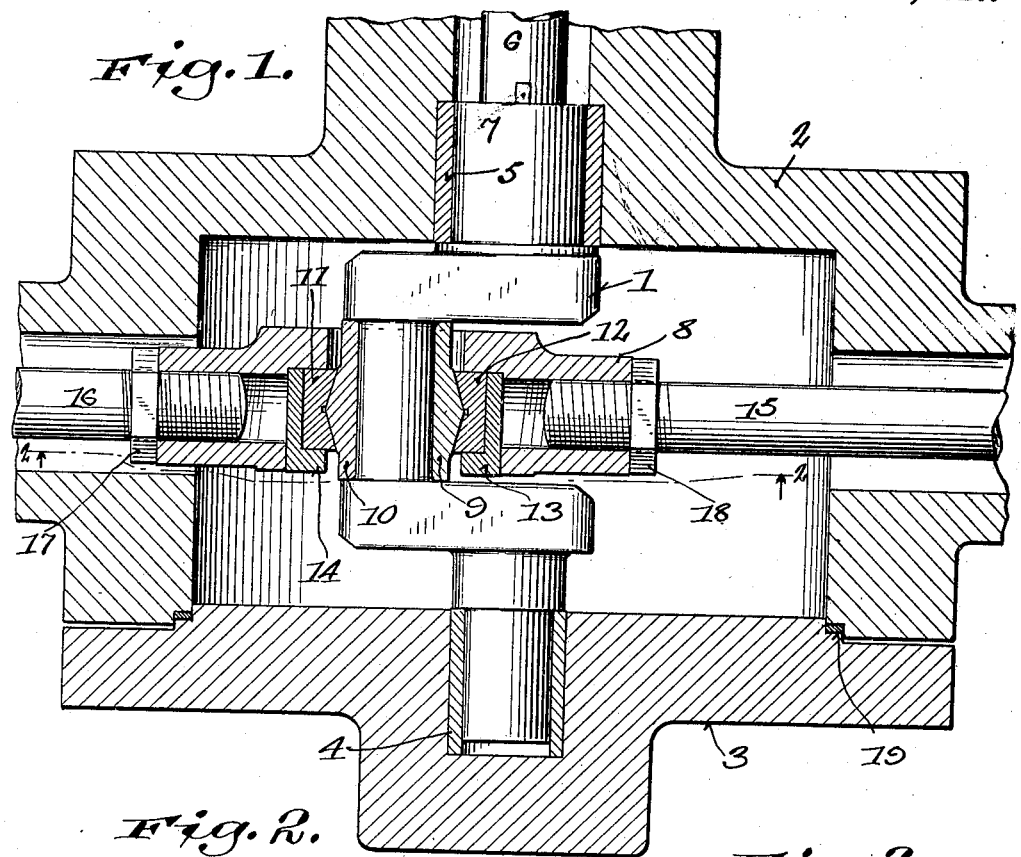
Fig. 1.
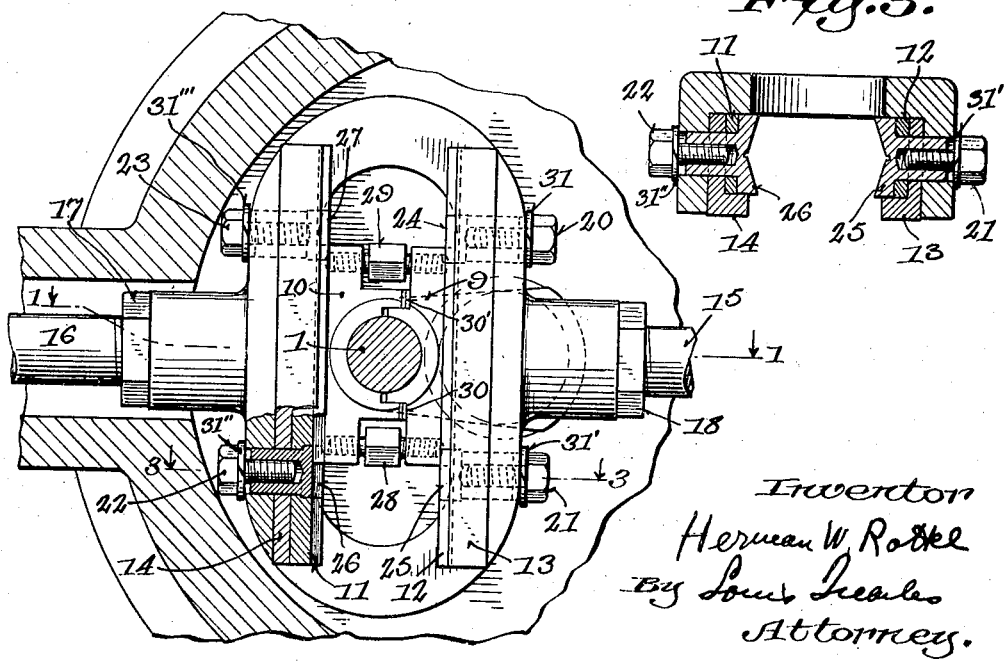
Fig. 2.
Fig. 3.
Inventor
Herman W. Rottel
By Louis Searles
Attorney.

UNITED STATES PATENT OFFICE.

HERMAN W. ROTTEL, OF MILWAUKEE, WISCONSIN.

CRANK-MOUNTING FOR ICE-MACHINES OF THE COMPRESSION TYPE.

1,343,407.

Specification of Letters Patent.   Patented June 15, 1920.

Application filed December 29, 1919. Serial No. 348,162.

*To all whom it may concern:*

Be it known that I, HERMAN W. ROTTEL, a citizen of the United States, residing at Milwaukee, county of Milwaukee, and State of Wisconsin, have invented certain new and useful Improvements in Crank-Mountings for Ice-Machines of the Compression Type, of which the following is a specification.

My invention relates to new and useful improvements in the construction of cranks and crank chambers, providing a means whereby such cranks may be easily assembled and disassembled and so constructing the crank chamber that the whole crank may be easily removed therefrom. In crank chambers now in use it is necessary to dismount a large part of the machine in order to make adjustments and repairs on the crank or else it is necessary to make them inside the crank chamber.

The object of my invention is to provide a crank chamber with a crank keyed on to the drive shaft and with a crank chamber head so made that on removing said head and unscrewing the piston or pistons the whole crank may be slipped out of the crank chamber, allowing all repairs and adjustments to be made outside of the chamber and without disturbing the balance of the mechanism. My method of constructing the crank chamber and crank and cross-head with its bearing and slide bearings is compact and the whole may be easily assembled and disassembled.

With the above and other objects in view, my invention has particular relation to certain novel features of construction, operation and arrangement of parts, an example of which is given in this specification and illustrated in the accompanying drawings wherein:

Figure 1 is a horizontal sectional view of a crank case and cross-head taken on the line 1—1 in Fig. 2 looking in the direction of the arrows.

Fig. 2 is a vertical sectional view along the lines 2—2 in Fig. 1 looking in the direction of the arrows.

Fig. 3 is a horizontal sectional view along the lines 3—3 in Fig. 2 looking in the direction of the arrows.

Having particular reference to Fig. 1, 1 is a crank which revolves within a crank case 2 and the crank case head 3 between bearings 4 and 5; 6 is a drive shaft on which crank 1 is slidably mounted by means of a key 7; 8 is a cross-head through which a reciprocating motion is transmitted to the two piston rods 15 and 16 which are threaded into the cross-head 8 and held in place by the lock nuts 17 and 18; 9 and 10 are bearing members which form the bearing for the crank 1 in cross-head 8 and are held together by bolts 28 and 29, Fig. 2; 30 and 30 prime in Fig. 2 are shims to get the right spacing for the bearing made up of bearing members 9 and 10; 11 and 12 are two bearing members mounted in the cross-head 8 and form a slide bearing for the crank bearing made up of bearing members 9 and 10; 13 and 14 are liners which when removed allow the bearing members 11 and 12 and the bearing members 9 and 10 to be removed from the cross-head 8; 19 is a gasket to make a tight joint between the crank case head 3 and the crank case 2.

Having particular reference to Fig. 2; 20 and 21 are two bolts and 24 and 25 are two nuts to hold together bearing member 12 and liner 13 and to fasten them to cross-head 8; 22 and 23 are bolts and 26 and 27 are nuts to hold together bearing member 11 and liner 14 and to fasten them to cross-head 8: 31, 31 prime, 31 double and 31 triple prime are four lock washers. This combination is easily assembled and disassembled. Crank case head 3 is easily removed from crank case 2; pistons 15 and 16 may be unscrewed from cross-head 8 thereby allowing the crank 1 and the cross-head 8 together with the crank bearing made up of bearing members 9 and 10 and the slide bearing made up of bearing members 11 and 12 to be easily removed from the crank case 2; by removing liners 13 and 14 by means of loosening bolts 20, 21, 22, 23, 28, 29, the crank bearing members 9 and 10 and the slide bearing members 11 and 12 can easily be removed from the cross-head 8 and the crank 1. The key 7 is so constructed as to allow the crank 1 to be detached from the drive shaft 6 by merely pulling the crank 1 out through the opening made by the removal of the crank case head 3.

I have described one, and to my present knowledge, the preferred form of my improved crank shaft but changes may be made and variations introduced within the scope of the appended claims.

Having particularly described my invention, I claim:

1. A crank mounting capable of use in an ice machine mounted in a crank case and which consists in a crank, a cross-head straddling said crank and reciprocated thereby, a shaft or shafts attached to said cross-head and reciprocating therewith, a removable crank case head and means for detachably mounting the said crank on the crank shaft so as to permit of the same being removed from the crank case through the opening left by the removal of the crank case head.

2. A completely inclosed crank case consisting of a case proper and a tightly fitting but removable crank case head and crank bearing in the crank case and a similar bearing in the crank case head, a crank shaft journaled to revolve in said bearings and containing a crank revolving therebetween, said crank being detachably mounted on said crank shaft, a bearing on said crank consisting of a plurality of pieces, a slide encompassing said crank bearing so that the same may reciprocate therein, said slide being provided with means for attaching piston rods thereto, and piston rods detachably attached to said attaching means on said slide.

HERMAN W. ROTTEL.

Witnesses:
VALEMTINE RAYMOND,
HOWARD A. HARTMAN.